Feb. 17, 1925.

1,526,960

B. M. BROWNELL

SWIVEL PIPE JOINT

Filed Jan. 23, 1924

Inventor:
Barnett Morse Brownell,
by Tippey Kingsland
His Attorneys.

Patented Feb. 17, 1925.

1,526,960

UNITED STATES PATENT OFFICE.

BARNETT MORSE BROWNELL, OF ST. LOUIS, MISSOURI, ASSIGNOR TO DIAMOND METAL PRODUCTS CO., OF ST. LOUIS, MISSOURI, A CORPORATION OF MISSOURI.

SWIVEL PIPE JOINT.

Application filed January 28, 1924. Serial No. 688,913.

*To all whom it may concern:*

Be it known that I, BARNETT MORSE BROWNELL, a citizen of the United States, residing at St. Louis, Missouri, have invented a new and useful Swivel Pipe Joint, of which the following is a specification.

This invention relates to improvements in swivel pipe joints, and consists in the novel construction hereinafter disclosed.

An object of the invention is to provide a swivel pipe joint having the swivel members thereof designed and arranged to support a sealing gasket effectively to seal the joints between the two members.

Another object of the invention is to provide a joint of the class described with a sealing gasket so arranged that it will maintain a close joint regardless of the temperature or character of fluid passing through the joint.

Additional advantages of the construction will be apparent from the following detailed description thereof, taken in connection with the accompanying drawings in which—

Figure 1:
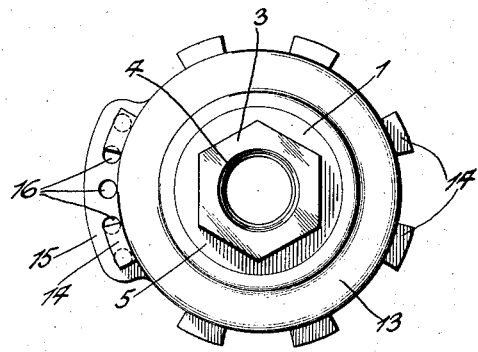
Fig. 1 is a plan view.
Figure 2:
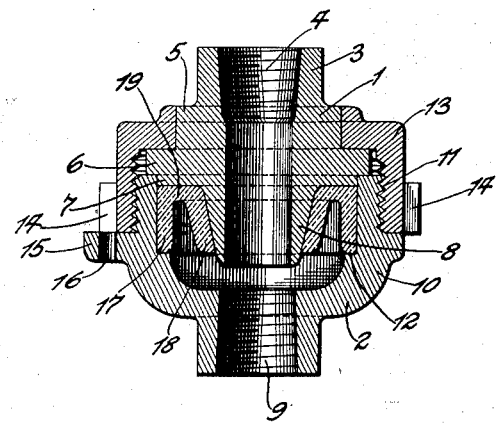
Fig. 2 is a vertical section through the joint.

In the embodiment of the invention illustrated in the drawing the joint is shown as including coupling members 1 and 2, both members being formed from suitable castings and said members including in detail the following features.

The member 1 comprises an upper throat section 3 having an opening 4 therethrough threaded at its upper end and designed to receive in threaded engagement one end of the pipe line. Below the throat 3 the outer surface of the member is enlarged forming an annular flange 5. Below the flange 5 the casting 1 is extended radially forming the flange 6. Below the flange 6 the casting 1 is reduced in diameter forming an annular portion 7, the offset between the edge of the portion 7 and the flange 6 constituting a shoulder. Below the portion 7 the casting extends downwardly forming a tapered end 8.

The member 2 includes a threaded throat 9 for receiving in threaded engagement the other end of the pipe line. Above the throat 9 the casting is belled outwardly forming the portion 10, the upper part of which is reduced in diameter forming a threaded portion 11.

The inner surface of the member 2 near the top portion thereof is reamed out or cut away to form a ledge 12 upon which the lower edge of the gasket member seats. The two members are held together by a cap 13 that threads over the portion 11 of the member 1, the upper wall of the cap being cut away to encompass the flange 5 of the member 1, the edge of the opening extending over and bearing against the upper face of the flange 6 so that when the cap is screwed downwardly into position it will hold the two members 1 and 2 in swivel adjustment, so that they may have relative movement without being displaced. The cap 13 is provided with radial lugs 14 for manipulative engagement. On one side the member 2 carries a segmental flange 15 having openings 16 therein so that, after the cap 13 has been set to clamp the members 1 and 2 together, it may be locked in position by pins passing through said openings 16 in the flange 15 at the sides of the lugs 14 on the cap 13.

In order to effectively seal the joints between the members 1 and 2 a gasket of semi-hard rubber, or other appropriate material, is provided; said gasket comprising a straight wall 17 and an outwardly inclined wall 18, said two walls being integrally connected by a top wall 19 having a flat surface. The gasket is seated so that the lower edge of the wall 17 rests on the ledge or shoulder 12 and extends outwardly so that the top wall thereof fits firmly against the lower surface of the portion 7. The outer surface of the wall 18 is tapered to conform to the exterior surface of the portion 8 against which it firmly seats.

The gasket thus constructed has sufficient resiliency, when placed in position to exert sealing pressure against the contacting surfaces, to seal the joint without any fluid pressure. Thus the joint when used in a steam line constitutes an effective seal even when pressure and temperature of the fluid in the line is reduced.

A joint of the type disclosed will hold pressure when the line is cold, as well as when the line is under high steam pressure, it being understood that as the pressure in the line increases the relative outward pressure against the walls of the contacting surfaces of the gasket will likewise be increased as the pressure is trapped in the channel between the walls 17 and 18 and the gasket is thus, by fluid pressure, forced outwardly proportionately to the amount of pressure passing through the joint.

The joint is highly effective under all conditions of temperature and pressure of fluid passing therethrough. Heretofore it has been found that joints utilizing gaskets of flexible material would leak when the pressure and temperature of the fluid was reduced. In the present structure the seal is not dependent alone upon the fluid pressure, the gasket having sufficient resiliency, due to its construction and position in the joint, to constitute a normal seal regardless of the pressure on the pipe line.

I am aware that the invention may be modified in certain particulars without departing from the spirit and scope thereof. I do not limit myself, therefore, to the exact description, but what I claim and desire to secure by Letters Patent is:—

1. A pipe coupling comprising a bell-shaped exteriorly threaded member, a shoulder on the inside of said member, a second member extending into the bell member and having a tapered inner end, a circular portion on said second member contacting with the inner surface of the wall of said first member, a flange on said second member bearing against the end of said first member, a cap engaging the outer end of said flange and screwed on said first member holding said members in the relationship aforesaid, and a gasket comprising a pair of integrally united diverging walls confined between the wall of said first member and the tapered inner end of said second member, one wall of said gasket seated upon said shoulder and the integrally connected ends of said gasket contacting with said round portion of said second member.

2. A pipe coupling comprising a bell-shaped coupling member, a shoulder on the inside of said member, a second coupling member having a tapered inner end extending into said first member, a round portion on said second member contacting with the inner surface of the wall of said first member, a flange on said second member bearing against the end of said first member, a cap screwed on said first member and engaging said flange and holding said coupling members in the relationship aforesaid, and a gasket comprising a pair of integrally united spaced walls one of which bears against the inner surface of said first coupling member and is seated upon said shoulder, and the other of which encircles and conforms to the shape of said tapered inner end of said second member and the integral connection of which walls bear against the inner surface of said circular portion of said second member.

3. A pipe coupling comprising a bell-shaped coupling member, a shoulder on the inside of said member, a second coupling member extending into said first member, a gasket comprising a pair of spaced walls the end of one of which seats upon said shoulder and the other of which encircles the inner end of said second coupling member, an abutment on said second coupling member for the connected ends of said walls, and means holding said coupling members in swivel connection.

4. A pipe coupling comprising a coupling member, a second coupling member extending into the first one, a gasket comprising a pair of diverging integrally united walls, the outer one of which bears against the inner surface of the wall of said first coupling member and the inner one of which encircles the inner end of said second coupling member, a supporting shoulder integral with said first coupling member supporting the separated end of the outer wall of said gasket, an abutment integral with said second coupling member for the united ends of both of said walls of said gasket, and means holding said two coupling members in the relationship aforesaid.

BARNETT MORSE BROWNELL.